US012567679B2

(12) United States Patent
Welsh et al.

(10) Patent No.: US 12,567,679 B2
(45) Date of Patent: Mar. 3, 2026

(54) CIRCUIT ARCHITECTURES FOR A DIFFERENTIALLY SEGMENTED APERTURE ANTENNA

(71) Applicant: Battelle Memorial Institute, Columbus, OH (US)

(72) Inventors: Raphael J. Welsh, Powell, OH (US); Daniel A. Perkins, Lewis Center, OH (US); Daniel G. Loesch, Sunbury, OH (US); Douglas A. Thornton, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 575 days.

(21) Appl. No.: 18/050,565

(22) Filed: Oct. 28, 2022

(65) Prior Publication Data

US 2023/0138769 A1 May 4, 2023

Related U.S. Application Data

(60) Provisional application No. 63/273,349, filed on Oct. 29, 2021.

(51) Int. Cl.
*H01Q 21/06* (2006.01)
*H01Q 3/36* (2006.01)
*H04B 1/40* (2015.01)

(52) U.S. Cl.
CPC ............. *H01Q 21/061* (2013.01); *H01Q 3/36* (2013.01); *H04B 1/40* (2013.01)

(58) Field of Classification Search
CPC ...... H01Q 21/061; H01Q 3/36; H01Q 13/085; H01Q 21/064; H01Q 21/24; H04B 1/40; H04B 1/44; H04B 1/0007
See application file for complete search history.

(56) References Cited

U.S. PATENT DOCUMENTS

| | | | |
|---|---|---|---|
| 5,933,115 A | 8/1999 | Faraone et al. | |
| 6,621,469 B2 | 9/2003 | Judd et al. | |

(Continued)

FOREIGN PATENT DOCUMENTS

WO 2020219794 A1 10/2020

OTHER PUBLICATIONS

International Search Report and Written Opinion from corresponding PCT Appln. No. PCT/US2022/078843, dated Feb. 8, 2023. 10 pages.

(Continued)

*Primary Examiner* — Vladimir Magloire
*Assistant Examiner* — Anna K. Gosling
(74) *Attorney, Agent, or Firm* — Grossman, Tucker, Perreault & Pfleger, PLLC; Donald G. Weiss

(57) ABSTRACT

In an approach to a system for a differentially segmented aperture (DSA) antenna includes protrusions arranged in an array, and pixels formed in an array, each pixel formed between two adjacent protrusions; and one or more signal chains, each including: transmit circuitry comprising digital-to-analog circuitry to generate an analog signal at a selected operating frequency based on a transmit digital signal representing the first analog signal to be transmitted to a target; receive circuitry comprising analog-to-digital circuitry to receive a second analog signal at the plurality of pixels of the DSA antenna, and to generate a receive digital signal representing the second analog signal; and pixel combiner circuitry to receive the first analog signal and control the pixels of the array with the first analog signal, and to receive analog signals from the pixels of the array and combine the analog signals to form an array analog receive signal.

20 Claims, 16 Drawing Sheets

(56)                References Cited

U.S. PATENT DOCUMENTS

| | | | |
|---|---|---|---|
| 8,648,759 B2 | 2/2014 | Wang et al. | |
| 11,533,096 B2* | 12/2022 | Paramesh | H04B 1/18 |
| 2006/0038732 A1 | 2/2006 | Deluca et al. | |
| 2019/0154439 A1 | 5/2019 | Binder | |
| 2020/0343927 A1* | 10/2020 | Welsh | H01Q 13/085 |
| 2021/0249782 A1 | 8/2021 | Angeletti et al. | |

OTHER PUBLICATIONS

G. D'amato, G. Avitabile, G. Coviello and C. Talarico, "A beam steering unit for active phased-array antennas based on FPGA synthesized delay-lines and PLLs," 2015 International Conference on Synthesis, Modeling, Analysis and Simulation Methods and Applications to Circuit Design (SMACD), Istanbul, 2015, pp. 1-4, doi: 10.1109/SMACD.2015.7301709.

G. D'amato, G. Piccinni, G. Avitabile, G. Coviello and C. Talarico, "An integrated phase shifting frequency synthesizer for active electronically scanned arrays", Proc. 21st Int. Symp. Design Diagnostics Electron. Circuits Syst. (DDECS), pp. 91-94, Apr. 2018.

G. D'amato, G. Avitabile, G. Coviello and C. Talarico, "Dds-Pll Phase Shifter Architectures for Phased Arrays: Theory and Techniques," in IEEE Access, vol. 7, pp. 19461-19470, 2019, doi: 10.1109/ACCESS.2019.2895388.

G. D'amato, G. Avitabile, G. Coviello and C. Talarico, "Toward a novel architecture for beam steering of active phased array antennas," 2016 IEEE 59th International Midwest Symposium on Circuits and Systems (MWSCAS), Abu Dhabi, 2016, pp. 1-4, doi: 10.1109/MWSCAS.2016.7870074.

International Search Report and Written Opinion of International Application No. PCT/US22/78841, mail date Mar. 14, 2023, 15 pages.

Adesh Panwar, et al., "FPGA Based Phase Gradient Controller for Phased Array Radar Antenna", 11th International Radar Symposium India, NIMHANS Convention Centre, Bangalore, India, Dec. 2017, 4 pages.

International Preliminary Report on Patentability from corresponding PCT Appln. No. PCT/US2022/078841, dated May 10, 2024. 11 pages.

International Preliminary Report on Patentability from corresponding PCT Appln. No. PCT/US2022/078843, dated May 10, 2024. 8 pages.

* cited by examiner

CIRCUIT ARCHITECTURES FOR A DIFFERENTIALLY SEGMENTED APERTURE ANTENNA

CROSS-REFERENCE TO RELATED APPLICATIONS

The present application claims the benefit of the filing date of U.S. Provisional Application Ser. No. 63/273,349, filed Oct. 29, 2021, the entire teachings of which application is hereby incorporated herein by reference.

TECHNICAL FIELD

The present disclosure relates to circuit architectures for a differentially segmented aperture (DSA) antenna.

BACKGROUND

The DSA is an ultra-wideband, directional aperture that is capable of full-duplex communications and beam-steering (where beam steering is used to reference beam forming and directing in both the transmit and receive directions, which includes direction finding and nulling interferes) with a 180-degree field of regard. The DSA is also geometrically scalable and can increase the dimensions of beam-steering based upon its configuration, which are basic requisites of fifth generation cellular technology.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
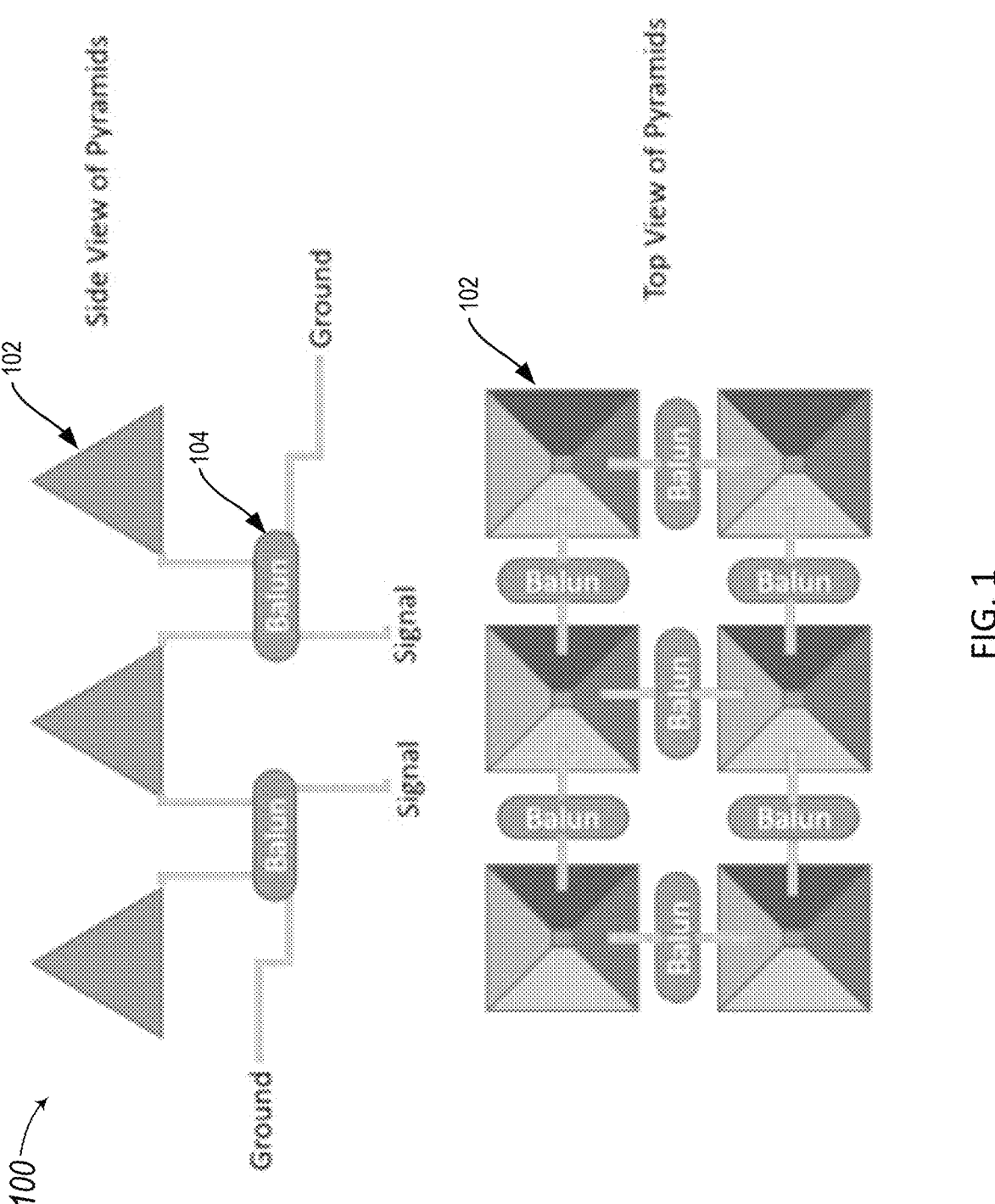
FIG. 1 illustrates various views of a differentially segmented aperture (DSA) antenna according to several embodiments of the present disclosure.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art.

Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

FIG. 1 illustrates various views of a DSA antenna 100 according to several embodiments of the present disclosure. The antenna 100 includes a plurality of protrusions, which in the examples herein are generally pyramid structures, arranged in an array, one of the pyramid structures is labeled 102. The DSA needs the protrusions, i.e., the pyramid structures 102, to capture the impingent electromagnetic energy, but the protrusions alone are insufficient to make use of that electromagnetic energy. Using the energy requires a signal chain, which ultimately converts the energy into digital information, and multiple signal chains can be used on one DSA. A signal chain may include transmit (Tx) circuitry, receive (Rx) circuitry, and/or both Tx and Rx circuitry. The aggregation of these signal chains is called the electrical architecture. Disclosed herein are details of the various approaches to the electrical architecture.

In some embodiments, the DSA interfaces with free space for electromagnetic capture and launch in a differential mode, which means that it functions based on a difference in signal between two conductors. Most off-the-shelf RF circuitry assumes a single ended mode of operation where a signal is on a single conductor and is referenced to a ground. The DSA architecture can be made to work with the single ended circuitry through a transformer referred to as a balun (short for balanced-unbalanced).

At least one face of each pyramid structure faces an adjacent pyramid structure, as illustrated in FIG. 1. Opposing faces of two adjacent pyramid structures form an antenna element. Balun circuitry 104 is disposed between two pyramid structures, to receive a differential signal generated by the element defined by two adjacent pyramid structures (in an Rx mode) and to generate a differential signal onto the two adjacent pyramid structures (in a Tx mode). As illustrated, in Tx mode, the balun circuitry 104 receives a single ended signal and generates a differential pair of signals, one for each opposing face of adjacent pyramid structures 102. In Rx mode, the balun circuitry 104 receives a differential signal (one from each opposing face of adjacent pyramid structures 102) and generates a single-ended signal. The electromagnetic position of an element is the phase center for that element. Each phase center represents a transmission (Tx) and reception (Rx) point for signals transmitted by, or received by, an element. The vertical and horizontal elements are arranged in an (m×n) array, having m number of rows and n number columns of elements. In some embodiments, the pyramid structures are generally identical to one another, and are also generally equidistant from each other, for example, each element is one inch apart from the nearest element.

The example illustrated in FIG. 1 shows how the baluns may connect the pyramids and convert the differential signal to a single ended signal, and a corresponding 2×1 DSA configuration. In this case each face of the pyramid structure 102 is connected to the opposing face through the differential side of the balun. In this disclosure this structure formed between two adjacent protrusions is referred to as a pixel.

Figure 2:
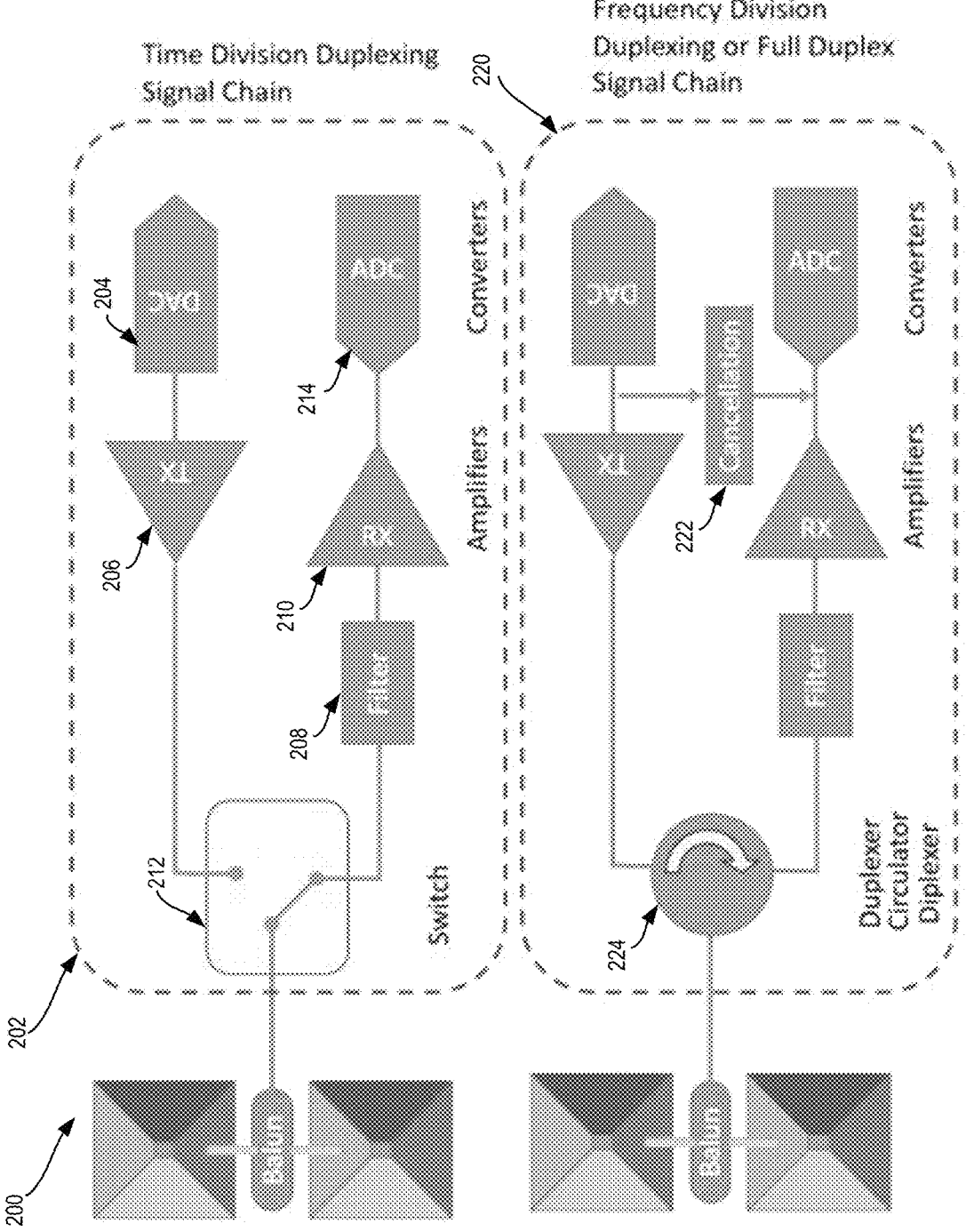
FIG. 2 illustrates signal chain circuitry examples for Tx and Rx operations of the array according to several embodiments of the present disclosure.

FIG. 2 illustrates signal chain circuitry examples for Tx and Rx operations of the array 200 according to several embodiments of the present disclosure. The first signal chain circuitry 202 is an example of time division multiplexing for Tx and Rx operations. Circuitry 202 includes Tx circuitry that includes digital-to-analog converter (DAC) circuitry 204 to receive a digital signal representing data and a selected operating frequency and may also include phase information for beam steering operations (described below). The digital signal may be generated by, for example, radio circuitry (not shown). The DAC circuitry 204 generates an analog signal representative of the data at a selected operating frequency to be transmitted to a target by the element of the array (via the balun circuitry). The Tx circuitry may also include transmit amplifier circuitry 206, which may be, for example, a power amplifier, to provide a selected signal gain on the output of the DAC circuitry 204. Circuitry 202 may also include Rx circuitry that includes filter circuitry 208 to filter the single-ended signal generated by the balun circuitry, and receive amplifier circuitry 210, which may be, for example, a low noise amplifier (LNA), to provide signal gain on the signal received by the balun circuitry. The Rx circuitry also includes analog-to-digital circuitry (ADC) 214 to generate a digital signal from the analog signal received by the balun circuitry. Switch circuitry 212 generally operates to switch between the Tx circuitry and Rx circuitry at defined time periods using, for example, time division duplexing (TDD).

Signal chain circuitry example 220 is similar to signal chain circuitry example 202, except signal chain circuitry example 220 is configured for frequency division duplexing (FDD) and/or full duplexing (FD) in Tx and Rx operational modes.

FDD allows simultaneous transmit and receive by transmitting and receiving on separate frequencies and filtering out the transmit frequency from the received signal. In the example of FIG. 2, the switch 212 of the TDD example is replaced by duplexer circuitry 224 to enable duplexing/full duplexing. The duplexer circuitry 224 may be a diplexer, a circulator, etc., for the FDD example. A diplexer divides transmit and receive by frequency, whereas a circulator acts like a series of gates permitting the transmit energy to largely avoid reflecting into the RX pathway. The diplexer is not adjustable and requires a designed-in approach to frequency operation. The circulator circuitry typically does not exceed approximately 1 GHz in bandwidth. Full duplex means the device can transmit and receive on the same frequency at the same time, isolating the RX path from the TX path. This is commonly achieved through using different antennas or a circulator, combined with a cancellation circuitry that connects the TX path to the RX path through an inverse signal. The DSA architecture achieves full duplex operation either by having the TX and RX pathways on different sets of protrusions, and thus using different signal chains for each mode, or by including a circulator.

Signal chain circuitry example 220 includes cancellation circuitry 222 coupled to the output of the DAC circuitry (in Tx mode) and the input of the ADC circuitry (in Rx mode) and generally configured to cancel Tx modulation waveforms so the input of the ADC does not receive the transmitted signals.

Figure 3:
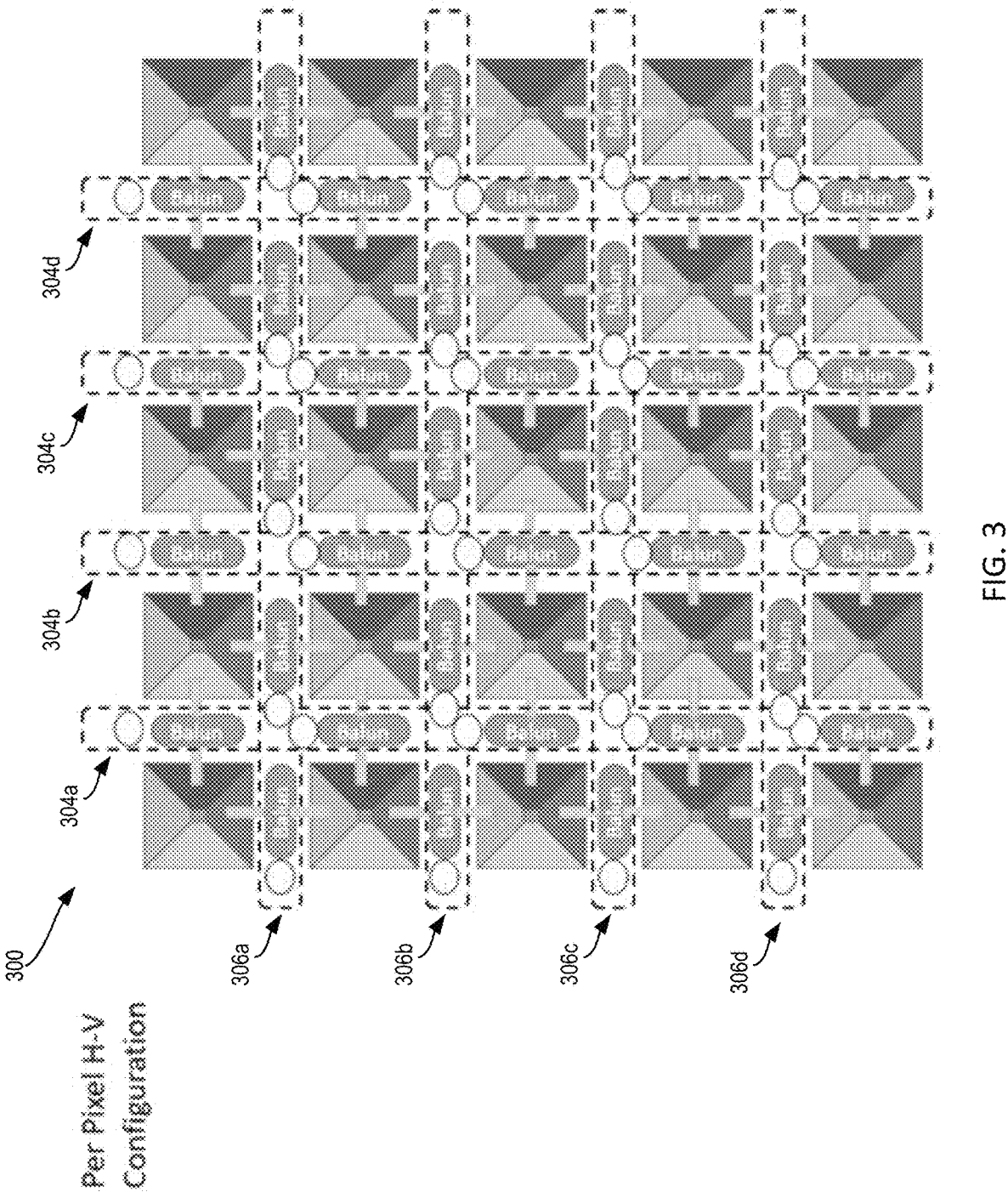
FIG. 3 illustrates another DSA antenna according to one embodiment of the present disclosure.

FIG. 3 illustrates another DSA antenna 300 according to one embodiment of the present disclosure. The example of FIG. 3 includes a 4×4 DSA that supports up to 40 individual signal chains. This embodiment illustrates the grouping of pixels. For example, horizontal pixels may be grouped together in respective columns 304a, 304b, 304c, and 304d; and vertical pixels may be grouped together in respective rows 306a, 306b, 306c, and 306d. Of course, the array in DSA antenna 300 may include pixel groupings not shown, for example, a sub-array may contain groups of four pixels in a square, groups of three pixels, two pixels, etc. Grouping of pixels may enable signal chain circuitry to control multiple pixels simultaneously and may also reduce circuit component costs compared to driving each pixel independently. This approach may also provide for increased signal dynamic range; aperture subsetting, where a portion of the aperture is dedicated to a function and a different portion dedicated to a different function; and dynamic and arbitrary beam forming and polarization generation.

Figure 4:
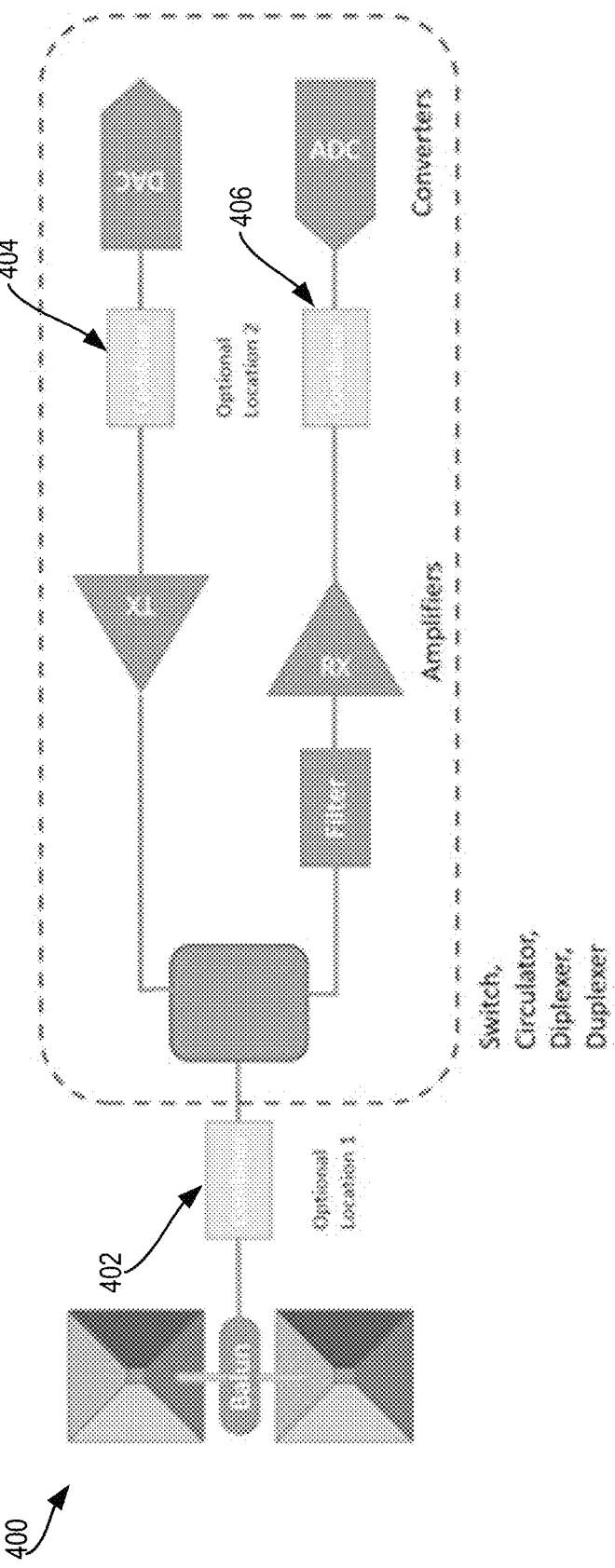
FIG. 4 illustrates signal chain circuitry according to another embodiment.

It is sometimes desirable to combine the signals so that one signal chain supports multiple pixels. In these cases, it is most logical to combine the pixels into rows and columns, which maintains multiple dynamic polarization transmission and reception operation and beam steering and forming in azimuth and elevation. FIG. 4 illustrates signal chain circuitry 400 according to another embodiment to drive a grouping of pixels and/or multiple groupings of pixels. The signal chain circuitry 400 is similar to the signal circuitry chain examples of FIG. 2 and includes pixel combiner circuitry 402 configured to drive a plurality of pixels in a group using a single instance of the Tx/Rx circuitry described above. The combiner circuitry 402 is a bidirectional device, meaning current can flow either way, or both ways simultaneously. Thus, in Tx mode, the pixel combiner circuitry 402 is coupled to a plurality of grouped pixels such that each pixel in the group receives the same signal, and in Rx mode the combiner circuitry 402 combines the signals from each pixel in the group to generate a single array analog receive signal. In some embodiments, the signal chain circuitry may be repeated for each grouping of pixels. Accordingly, in such embodiments, the signal chain circuitry 400 may also include a first group combiner circuitry 404 to split the output of the DAC circuitry to multiple groups, and second group combiner 406 circuitry to combine the received signals from multiple groups into a single signal.

Figure 5:
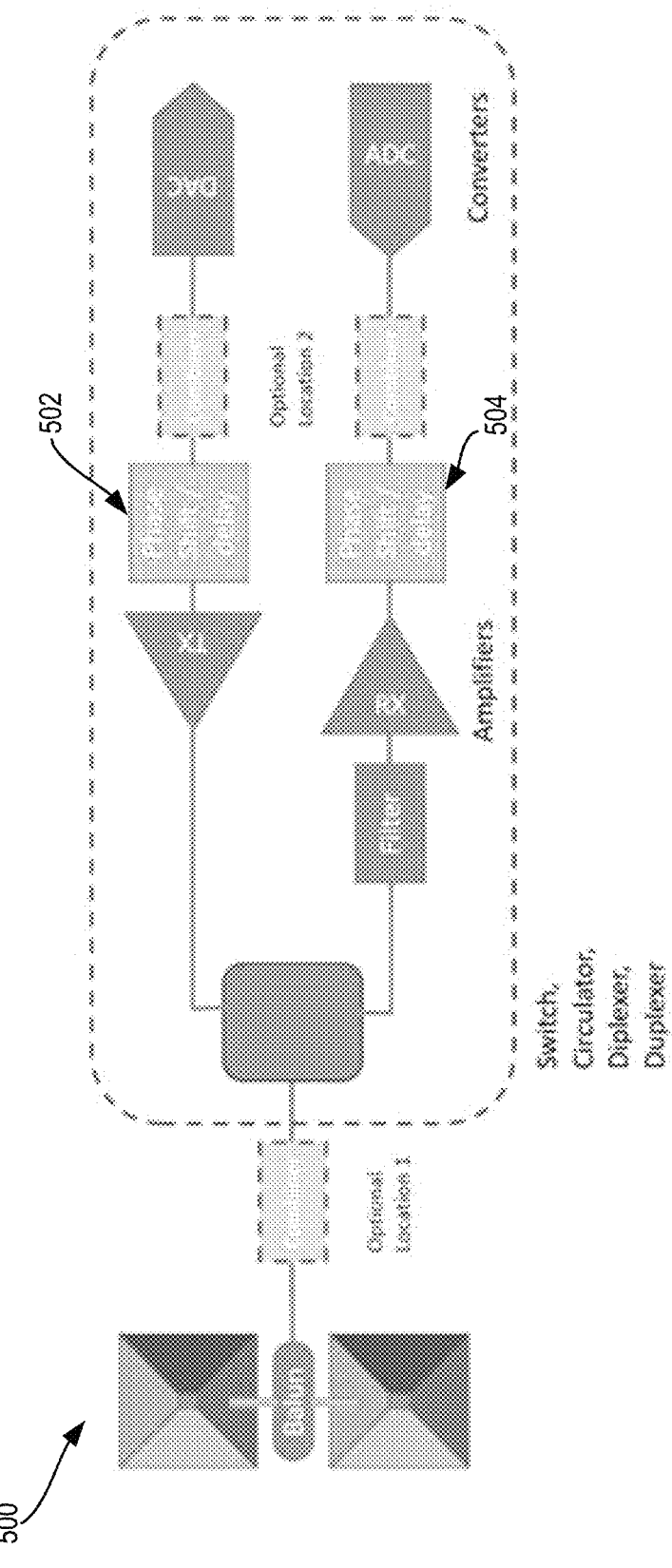
FIG. 5 illustrates signal chain circuitry according to another embodiment.

For beam steering operations, phase information may be imparted on multiple groups, for example, multiple horizontal groups to enable beam steering of the array in DSA antenna 300 in an elevation direction. Accordingly, FIG. 5 illustrates signal chain circuitry 500 according to another embodiment that includes first phase shift circuitry 502 to impart a phase shift (or time delay) on a group of pixels in Tx mode, and second phase shift/delay 504 to impart a phase shift (time delay) on a group of pixels in Rx mode.

Figure 6:
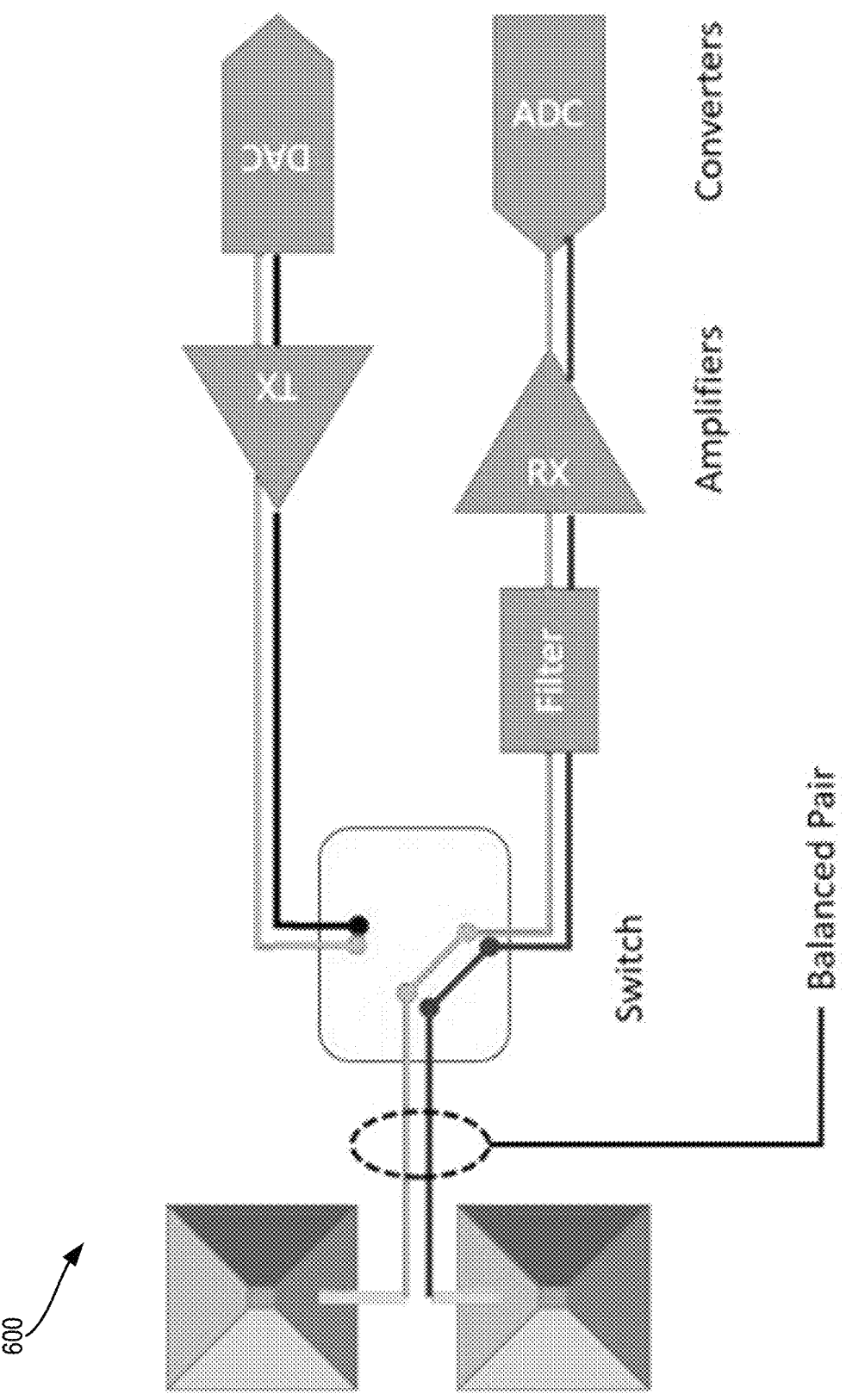
FIG. 6 illustrates signal chain circuitry according to another embodiment.

The number of RF components that operate on signals differentially instead of single ended is steadily increasing. This progress will enable the DSA to operate with a fully differential signal chain. FIG. 6 illustrates a fully differential signal chain circuitry 600 according to another embodiment. In this embodiment, the balun circuitry may be omitted, and the inputs are maintained as a balanced pair all the way to the conversion from or to a digital word at the ADC/DAC. Note that it is possible to also consider a semi-differential signal chain where differential signals are maintained to a location short of the DAC and ADC, and baluns are used to convert at that point.

FIGS. 7-10 illustrate various examples of combiner circuitry (e.g., pixel combiner circuitry and/or group combiner circuitry) to drive a plurality of pixels in a group and/or drive a plurality of groups of pixels.

Figure 7:
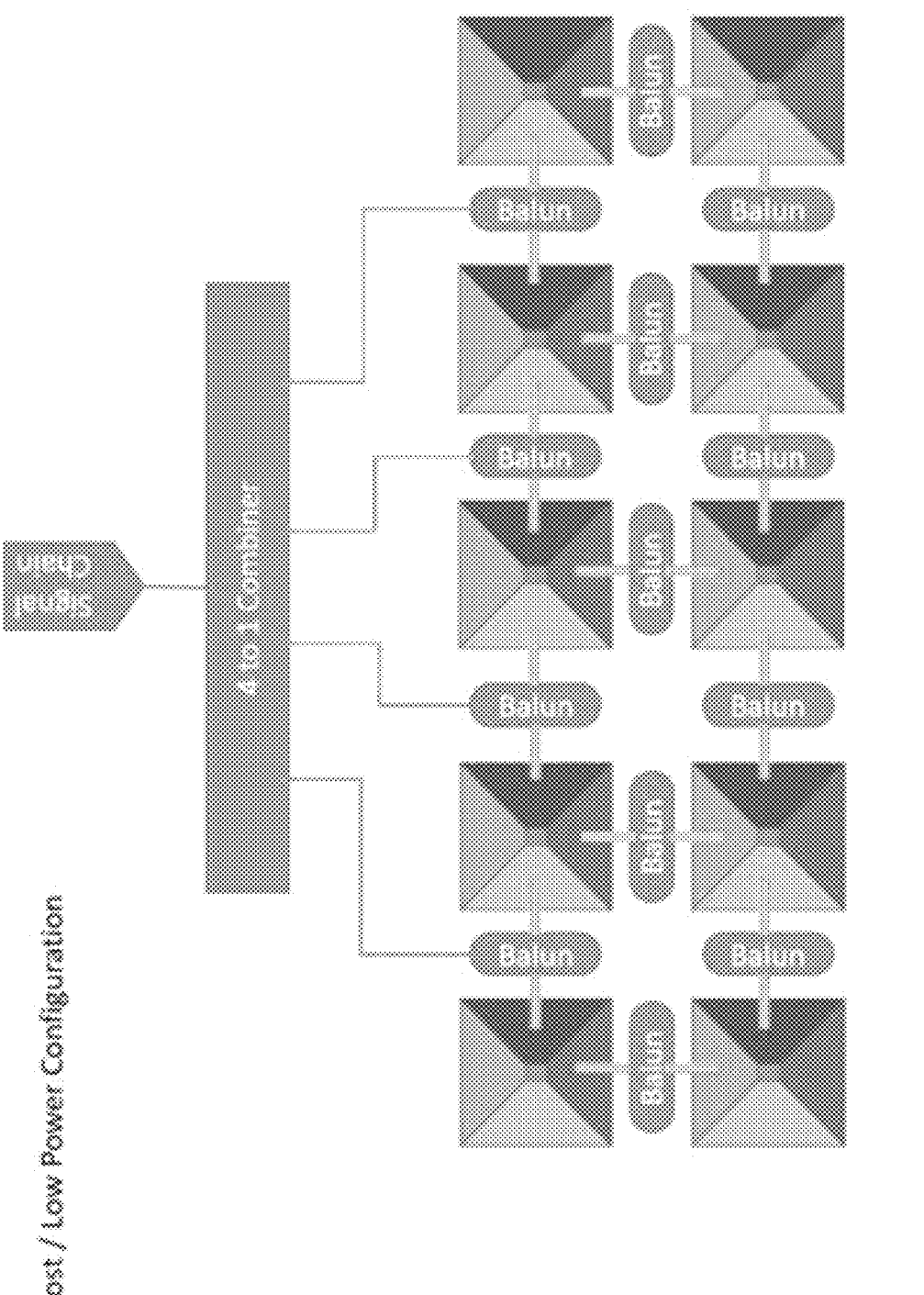
FIGS. 7-10 illustrate various examples of combiner circuitry to drive a plurality of pixels in a group and/or drive a plurality of groups of pixels.

FIG. 7 illustrates an example where the combiner is included after the signal chain and fans out to 4 pixels. These pixels are shown in a row, and a 4-1 combiner is utilized in front of the signal chain. In this scenario, all 4 pixels receive the same signal, and steering along the azimuth is not possible. In some embodiments, a phase shifter may be placed between the combiner and baluns. The approach represents a low power, low-cost configuration with corresponding reduced performance. Note that these examples could easily be extending to multiple DSAs, e.g., a 10×10 DSA requiring 9-1 combiners.

Figure 8:
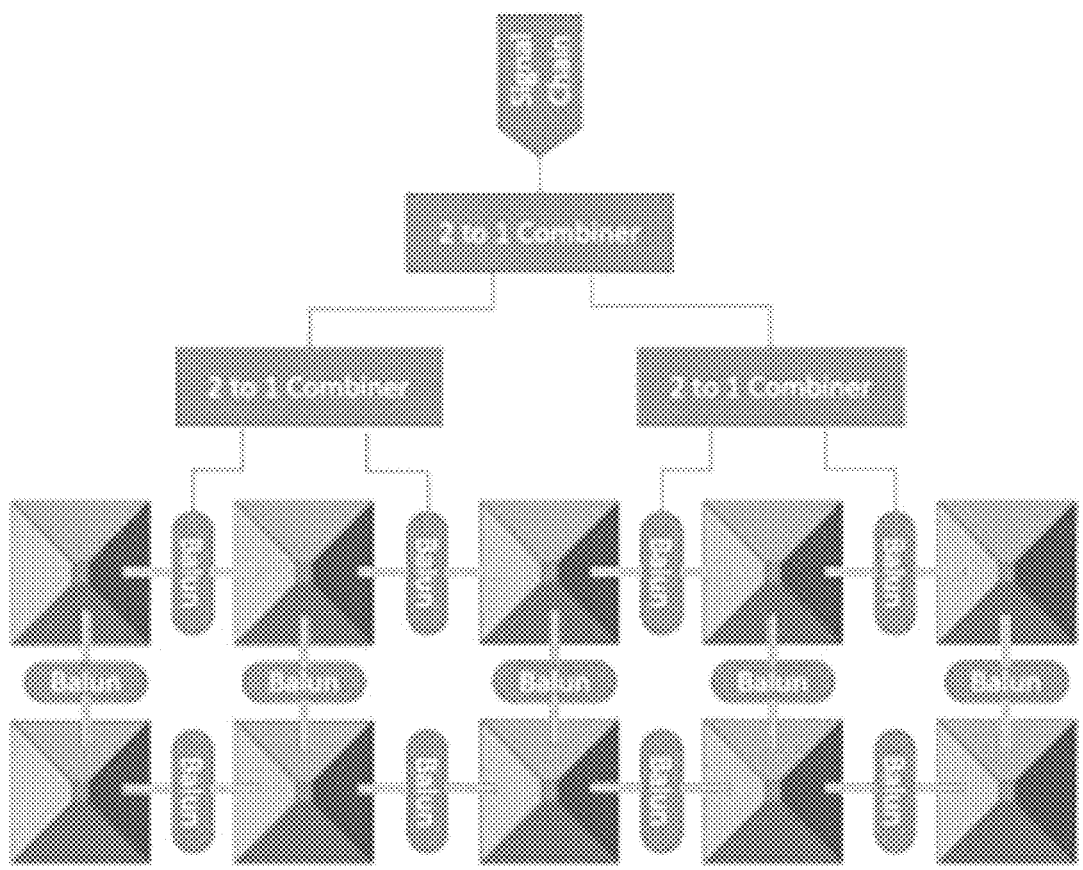

FIG. 8 illustrates an embodiment where multiple combiners may be used in series to create a combiner with larger fanout, or to enable phase shifting across multiple pixels. In the example of FIG. 8, two 2-1 combiners are stacked in series. Additionally, a mixer may be placed between the combiners, permitting some beam forming and steering between the groups.

Figure 9:
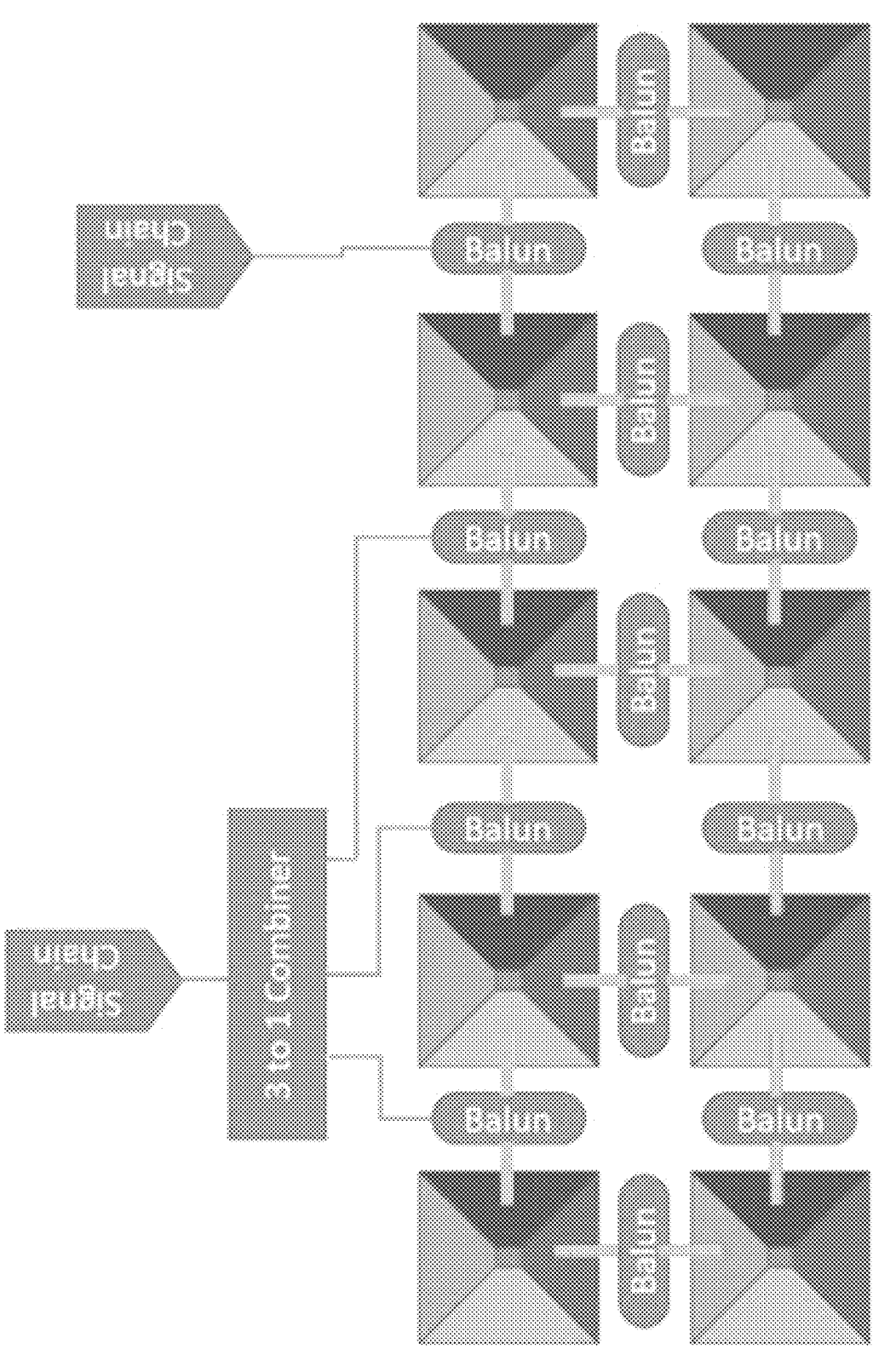

FIG. 9 illustrates that the combiner approach need not be homogeneous, i.e., the use of combiners is not balanced between the pixels. The combiner of FIG. 9 is a 3-1 and then a straight connection to the signal chain. This approach may be useful when the DSA is designed to process multiple signals of interest simultaneously, with different power/sensitivity needs. In this case when the full DSA performance is needed the two signal chains are combined in the digital domain.

Figure 10:
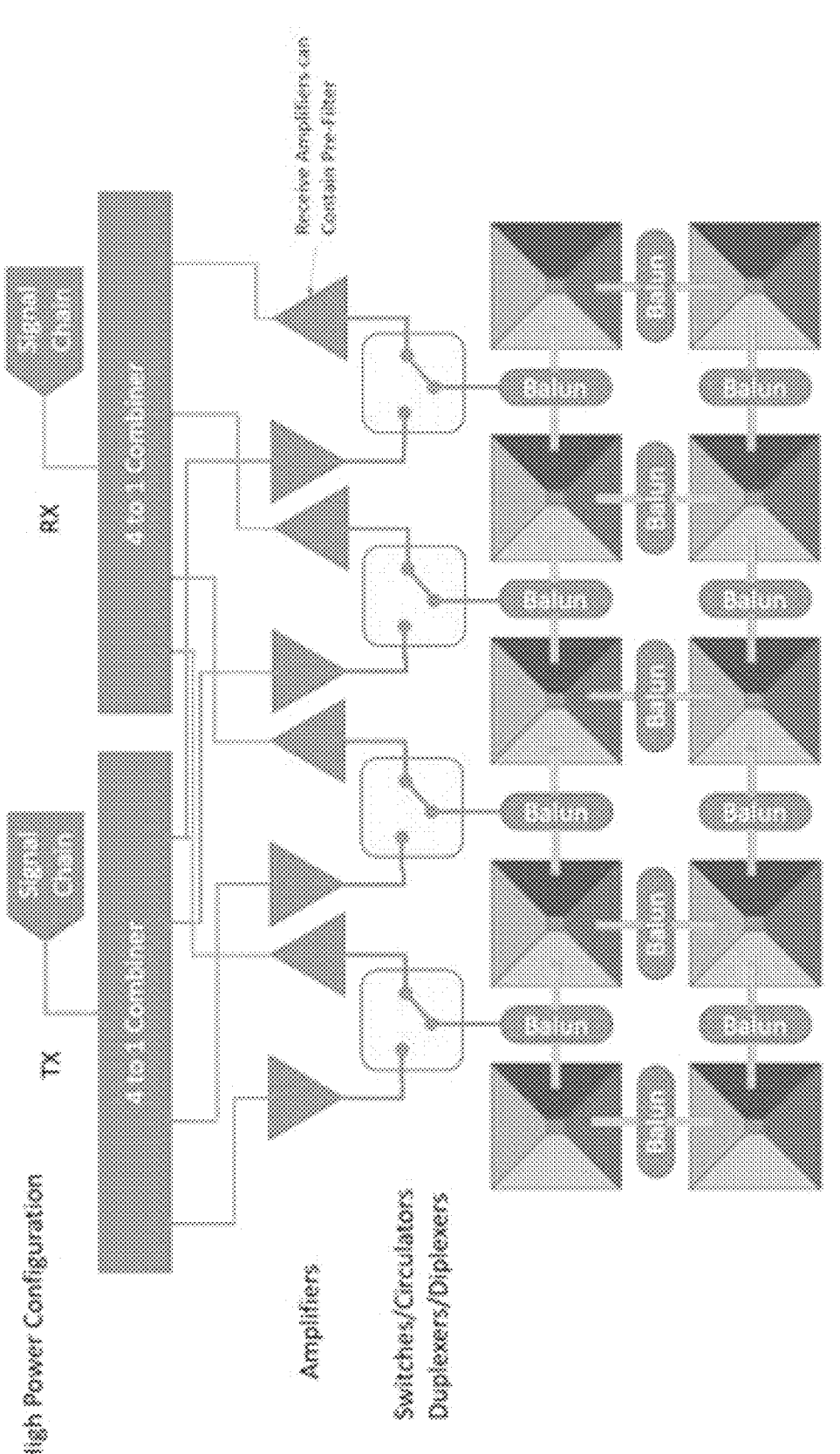

In FIG. 10, a final example configuration increases the performance by segregating the TX and RX pathways from the aperture via a duplexer (switch, circulator, diplexer). In FIG. 10, a doubling in the number of combiners is necessary, but the performance is increased greatly. The LNAs can negate the loss of the combiners, and one is no longer restricted to the power limitations of the combiners because the PA is downstream.

FIGS. 11-15 illustrate various examples of architectures that each have their own performance characteristics according to several embodiments of the present disclosure. Note that in these drawings, the combiner is shown interfacing directly with the balun. It is important to note that all of these drawings could also be shown with the combiners as shown in the 2nd position of FIG. 4 above.

Figure 11:
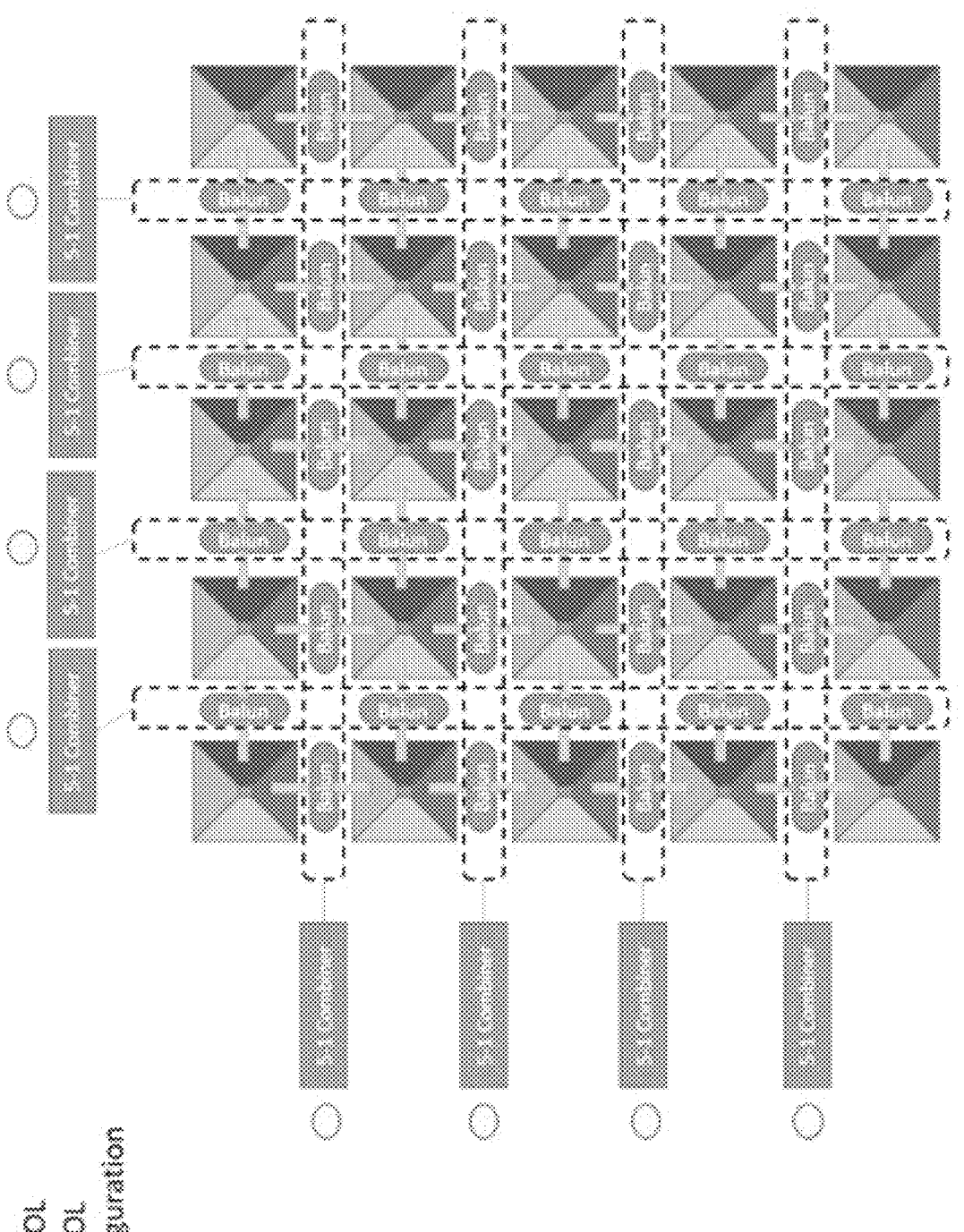
FIGS. 11-15 illustrate various examples of architectures according to several embodiments of the present disclosure.

The embodiment illustrated in FIG. 11 illustrates an architecture that offers 4 signal chains in horizontal polarization and 4 signal chains in vertical polarization. This configuration pairs well with Software Defined Radios (SDRs), which have power of two channel counts. This design allows simultaneous operation on both polarizations, the ability to measure incoming polarization, and the ability to beam steer and form in both azimuth and elevation.

Figure 12:
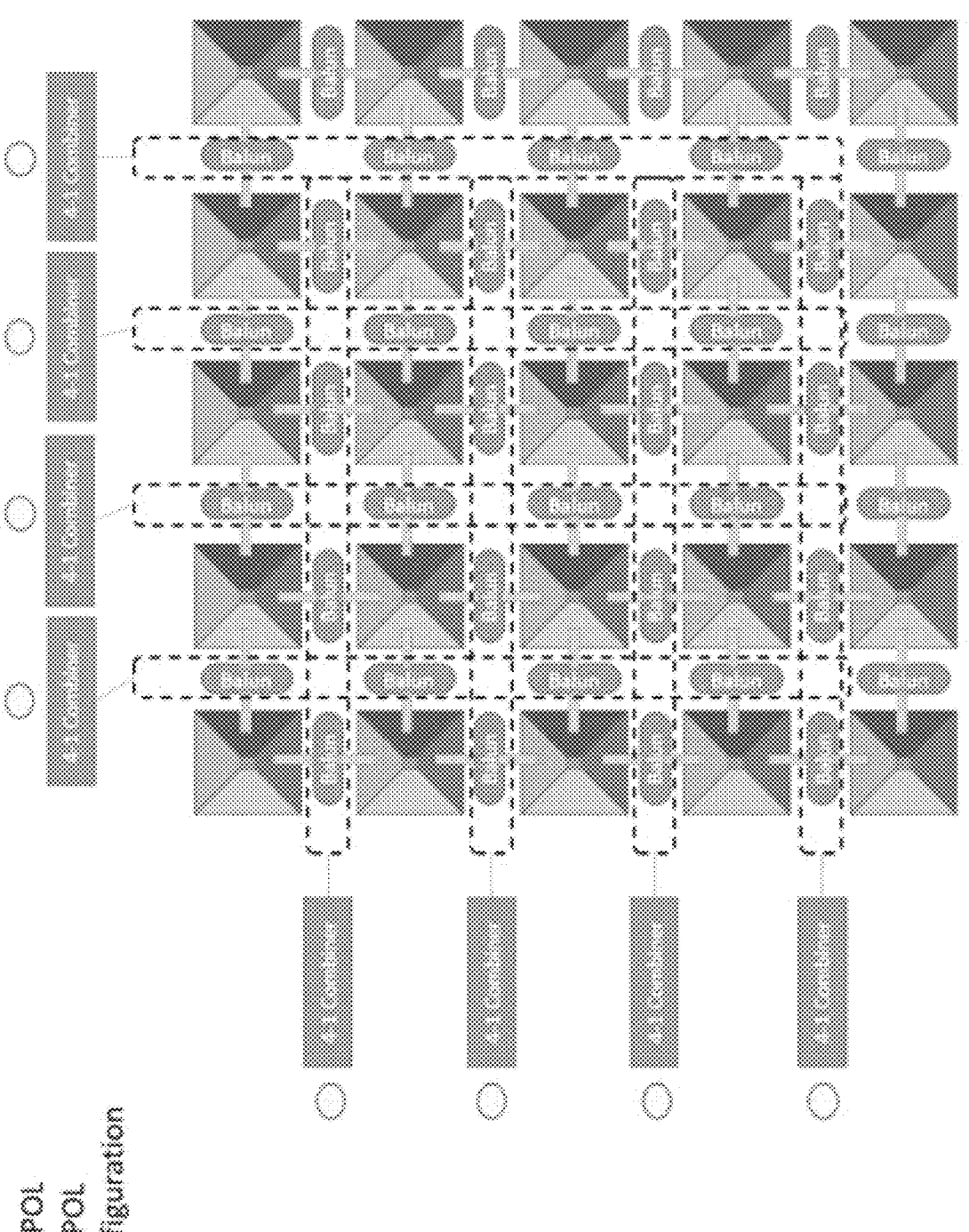

To mitigate the need for uncommon 5-1 combiners, the approach in FIG. 12 can be taken. Here the pixels on one vertical and one horizontal perimeter are not brought into the signal chain, causing a slight reduction in effective aperture area. Thus, only one face of the protrusions are in use. This approach permits more common combiner fanouts to be used, as powers of 2 are most popular. To make better use of the unused faces, the concept of FIG. 9 could be applied to permit an additional signal of interest to be investigated.

Figure 13:
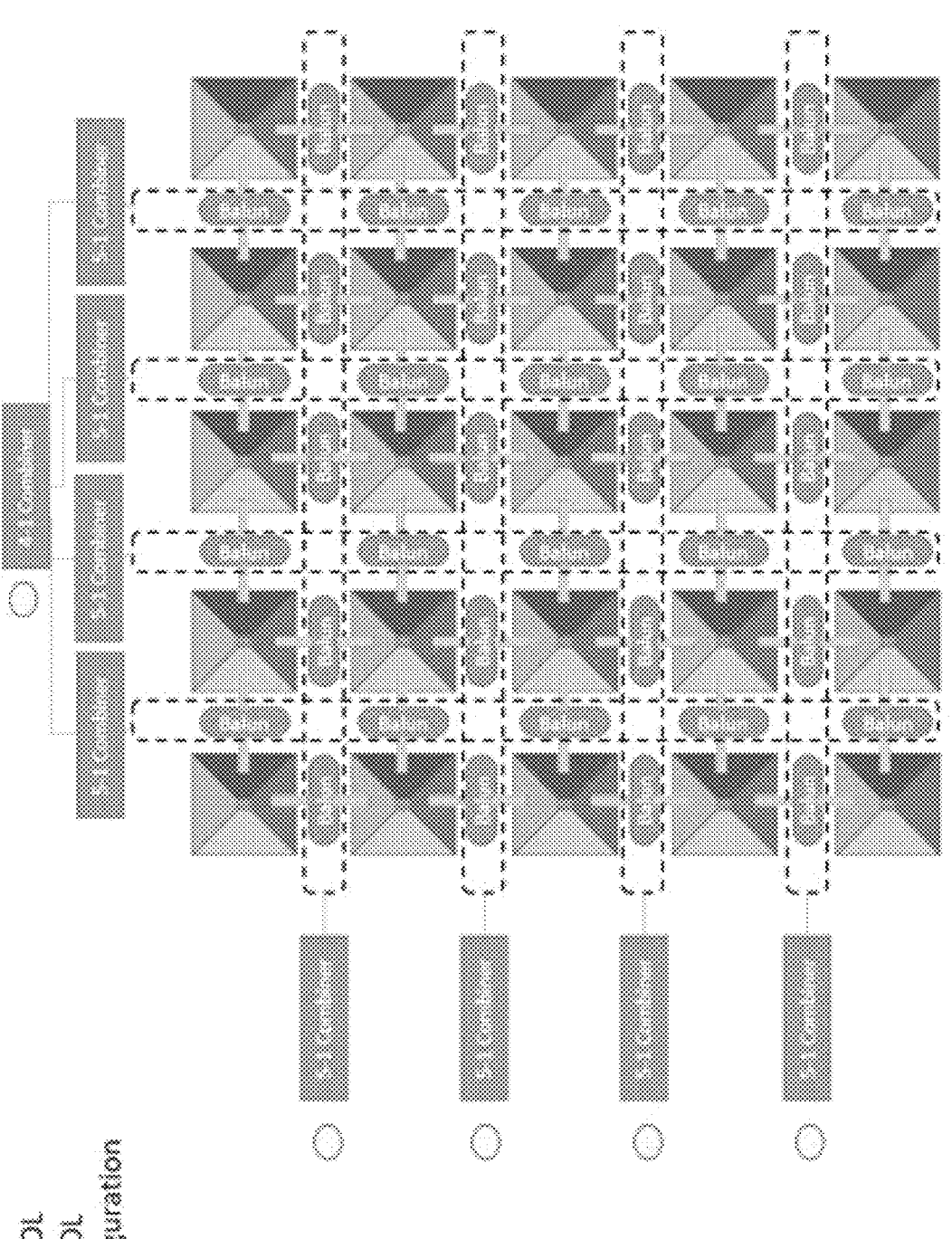

When a single polarization is of interest, or beam steering and forming are only necessary in one polarization, the embodiment illustrated in FIG. 13 is useful. Here the columns are combined into a single signal chain, while the rows are served by four signal chains. This is particularly useful if two signals of interest are in operation and forming and steering are not needed on one of those signals.

Figure 14:
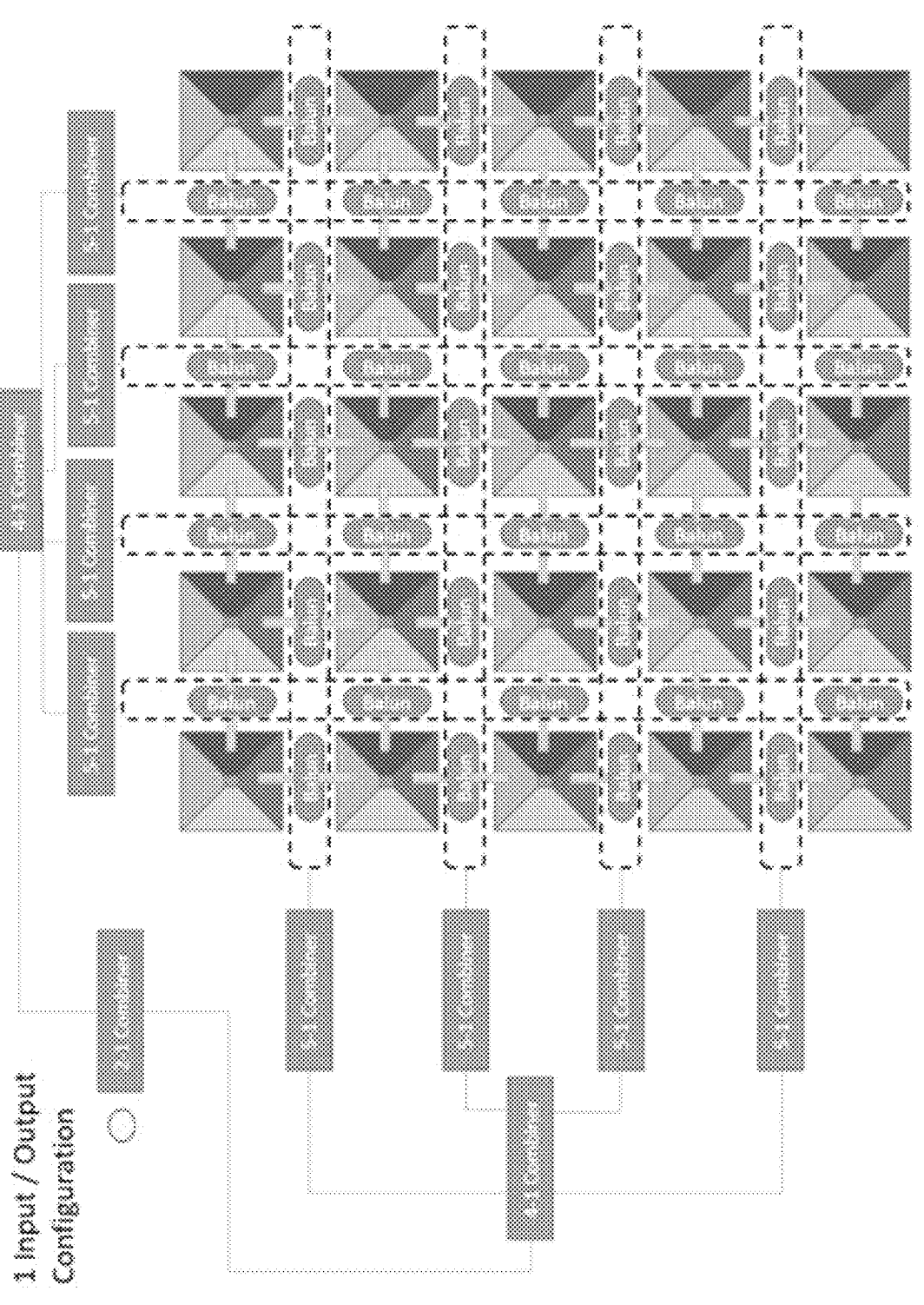

The embodiment illustrated in FIG. 14 is a DSA architecture that serves a single signal chain with no capability to measure or control polarization or to beam form/steer. This form may be used to support an existing single channel radio that simply needs efficient, ultrawideband performance.

Figure 15:
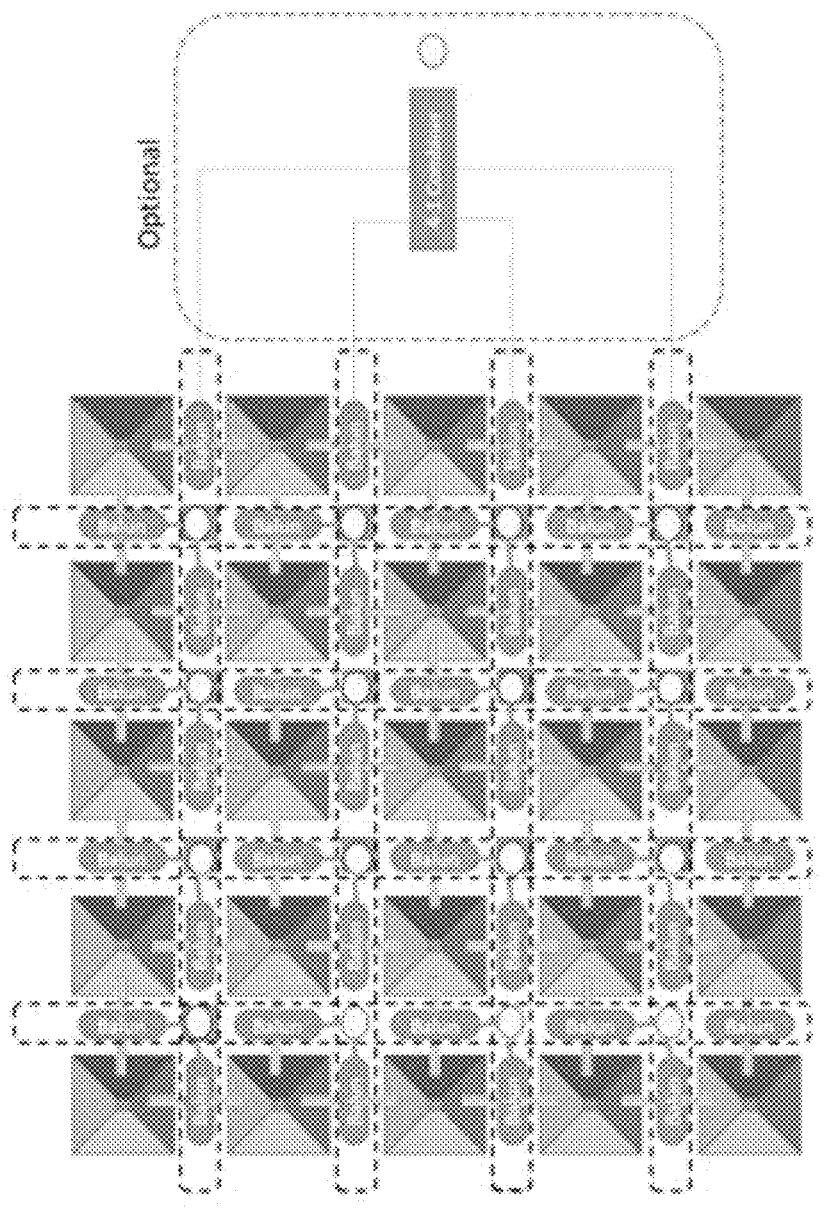
Figure 15:
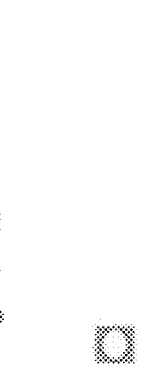

The embodiment illustrated in FIG. 15 shows a DSA where each pixel has its horizontal and vertical polarizations combined and is connected to its own signal chain. This approach is useful with low noise and high-power efficiency are required, and exquisite beamforming is needed, but the beam pattern and reception pattern shall be symmetrical in polarization.

Figure 16:
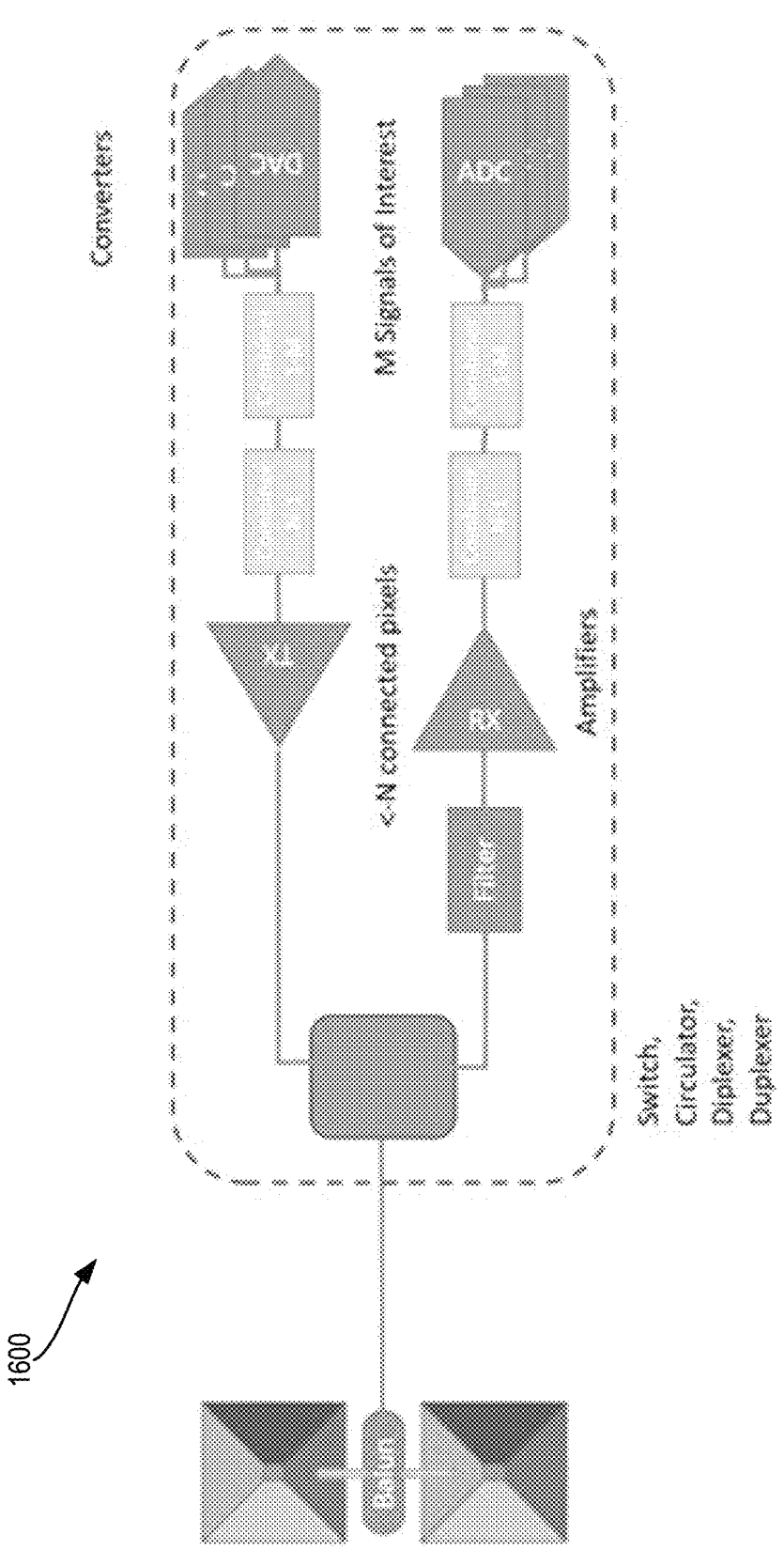
FIG. 16 illustrates signal chain circuitry that includes a plurality of instances of DAC/ADC circuitry.

The embodiment illustrated in FIG. 16 shows a signal chain circuitry 1600 that includes a plurality of instances of DAC/ADC circuitry to drive groups of pixel with unique signals and may also include vertical combiner circuitry (combiner 1–M) and/or horizontal combiner circuitry (combiner N–1). One of the key features of the DSA is its ultrawide bandwidth and ability to support many signals simultaneously. To achieve this, the architecture of FIG. 16 can be used in any of the preceding example combiner circuitry.

According to one aspect of the disclosure there is thus provided a system for a differentially segmented aperture (DSA) antenna, the system including a plurality of protrusions arranged in an array, and a plurality of pixels formed in an array, each pixel formed between two adjacent protrusions; and one or more signal chains. Each signal chain of the one or more signal chains including: transmit (Tx) circuitry comprising digital-to-analog (DAC) circuitry to generate a first analog signal at a selected operating frequency based on a transmit digital signal representing the first analog signal, the first analog signal to be transmitted by the DSA antenna to a target; receive (Rx) circuitry comprising analog-to-digital (ADC) circuitry to receive, from the target, a second analog signal at the plurality of pixels of the DSA antenna, and to generate a receive digital signal representing the second analog signal; and pixel combiner circuitry to receive the first analog signal and control the pixels of the array with the first analog signal, the pixel combiner circuitry also to receive a plurality of analog signals from the pixels of the array and combine the plurality of analog signals from the pixels of the array to form an array analog receive signal.

According to another aspect of the disclosure, there is provided a system for a differentially segmented aperture (DSA) antenna. The system including: a plurality of protrusions arranged in an array, and a plurality of pixels formed in an array, each pixel formed between two adjacent protrusions; and one or more signal chains. Each signal chain of the one or more signal chains including: transmit (Tx) circuitry comprising digital-to-analog (DAC) circuitry to generate a first analog signal at a selected operating frequency based on a transmit digital signal representing the first analog signal, the first analog signal to be transmitted by the DSA antenna to a target; transmit amplifier circuitry to amplify the first analog signal with a first selected signal gain; receive (Rx) circuitry comprising analog-to-digital (ADC) circuitry to receive, from the target, a second analog signal at the plurality of pixels of the DSA antenna, and to generate a receive digital signal representing the second analog signal; receive amplifier circuitry to amplify received signals with a second selected signal gain; pixel combiner circuitry to receive the first analog signal and control the pixels of the array with the first analog signal, the pixel combiner circuitry also to receive a plurality of analog signals from the pixels of the array and combine the plurality of analog signals from the pixels of the array to form an array analog receive signal; and phase shift circuitry to generate a phase shift for the first analog signal to perform beam steering.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

"Circuitry", as used in any embodiment herein, may comprise, for example, singly or in any combination, hardwired circuitry, programmable circuitry such as processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

Any of the operations described herein may be implemented in a system that includes one or more non-transitory storage devices having stored therein, individually or in combination, instructions that when executed by circuitry to perform the operations. The storage device includes any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. The instructions may be of the form of firmware executable code, software executable code, embedded instruction sets, application software, etc. Other embodiments may be implemented as software executed by a programmable control device. Also, it is intended that operations described herein may be distributed across a plurality of physical devices, such as processing structures at more than one different physical location.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. A system, comprising:
a differentially segmented aperture (DSA) antenna comprising a plurality of protrusions arranged in an array, and a plurality of pixels formed in an array, each pixel formed between two adjacent protrusions; and
one or more signal chains, each signal chain of the one or more signal chains comprising:
transmit (Tx) circuitry comprising digital-to-analog (DAC) circuitry to generate a first analog signal at a selected operating frequency based on a transmit digital signal representing the first analog signal, the first analog signal to be transmitted by the DSA antenna to a target;
receive (Rx) circuitry comprising analog-to-digital (ADC) circuitry to receive, from the target, a second analog signal at the plurality of pixels of the DSA antenna, and to generate a receive digital signal representing the second analog signal; and
pixel combiner circuitry to receive the first analog signal and control the pixels of the array with the first analog signal, the pixel combiner circuitry also to receive a plurality of analog signals from the pixels of the array and combine the plurality of analog signals from the pixels of the array to form an array analog receive signal.

2. The system of claim 1, wherein each protrusion of the plurality of protrusions comprises a pyramid structure.

3. The system of claim 1, wherein a first subset of the pixels is grouped together to form a first sub-array of pixels.

4. The system of claim 1, wherein a second subset of the pixels being grouped together to form a second sub-array of pixels; and wherein the second sub-array of pixels further comprises group combiner circuitry to couple the second sub-array of pixels with a single signal chain of the one or more signal chains.

5. The system of claim 1, wherein each opposing face of each protrusion of the plurality of protrusions is connected to a different signal chain.

6. The system of claim 1, wherein the transmit circuitry and the Rx circuitry further comprises phase shift circuitry to generate a phase shift for the first analog signal to perform beam steering.

7. The system of claim 1, wherein the signal chains further comprise:
transmit amplifier circuitry to amplify the first analog signal with a first selected signal gain; and
receive amplifier circuitry to amplify received signals with a second selected signal gain.

8. The system of claim 7, further comprising:
a first combiner in the transmit circuitry coupled between the DAC circuitry and the transmit amplifier circuitry; and
a second combiner in the Rx circuitry coupled between the ADC circuitry and the receive amplifier circuitry.

9 10

9. The system of claim 1, wherein the one of more signal chains are processed in a differential mode, and further wherein the differential mode comprises maintaining a balanced pair of conductors.

10. The system of claim 1, further comprising switch circuitry to switch between the Tx circuitry and the Rx circuitry using time division multiplexing.

11. The system of claim 1, further comprising circulator circuitry to enable simultaneous Tx and Rx operations of the DSA antenna.

12. The system of claim 1, wherein pixels are grouped into one or more rows and one or more columns, with each row and each column receiving an individual signal chain, and further wherein each row and each column receiving the individual signal chain permits dynamic polarization transmission and reception, and beam steering in azimuth and elevation.

13. A system, comprising:

a differentially segmented aperture (DSA) antenna comprising a plurality of protrusions arranged in an array, and a plurality of pixels formed in an array, each pixel formed between two adjacent protrusions; and one or more signal chains, each signal chain of the one or more signal chains comprising:

transmit (Tx) circuitry comprising digital-to-analog (DAC) circuitry to generate a first analog signal at a selected operating frequency based on a transmit digital signal representing the first analog signal, the first analog signal to be transmitted by the DSA antenna to a target;

transmit amplifier circuitry to amplify the first analog signal with a first selected signal gain;

receive (Rx) circuitry comprising analog-to-digital (ADC) circuitry to receive, from the target, a second analog signal at the plurality of pixels of the DSA antenna, and to generate a receive digital signal representing the second analog signal;

receive amplifier circuitry to amplify received signals with a second selected signal gain;

pixel combiner circuitry to receive the first analog signal and control the pixels of the array with the first analog signal, the pixel combiner circuitry also to receive a plurality of analog signals from the pixels of the array and combine the plurality of analog signals from the pixels of the array to form an array analog receive signal; and phase shift circuitry to generate a phase shift for the first analog signal to perform beam steering.

14. The system of claim 13, wherein each protrusion of the plurality of protrusions comprises a pyramid structure.

15. The system of claim 13, wherein a first subset of the pixels is grouped together to form a first sub-array of pixels.

16. The system of claim 13, wherein a second subset of the pixels is grouped together to form a second sub-array of pixels; and wherein the second sub-array of pixels further comprises group combiner circuitry to couple the second sub-array of pixels with a single signal chain of the one or more signal chains.

17. The system of claim 13, wherein each opposing face of each protrusion of the plurality of protrusions is connected to a different signal chain.

18. The system of claim 13, wherein the signal chain is processed in a differential mode, and further wherein the differential mode comprises maintaining a balanced pair of conductors.

19. The system of claim 13, wherein pixels are grouped into one or more rows and one or more columns, with each row and each column receiving an individual signal chain, and further wherein each row and each column receiving the individual signal chain permits dynamic polarization transmission and reception, and beam steering in azimuth and elevation.

20. The system of claim 13, further comprising circulator circuitry to enable simultaneous Tx and Rx operations of the DSA antenna.

* * * * *